US008561939B2

(12) United States Patent
Malkin et al.

(10) Patent No.: US 8,561,939 B2
(45) Date of Patent: Oct. 22, 2013

(54) APPARATUS FOR TAXIING AN AIRCRAFT

(75) Inventors: Peter Malkin, Hexham (GB); Geraint Wyn Jewell, Owlthorpe (GB)

(73) Assignee: Rolls-Royce PLC, London (GB)

( * ) Notice: Subject to any disclaimer, the term of this patent is extended or adjusted under 35 U.S.C. 154(b) by 280 days.

(21) Appl. No.: 12/730,586

(22) Filed: Mar. 24, 2010

(65) Prior Publication Data

US 2010/0252675 A1    Oct. 7, 2010

(30) Foreign Application Priority Data

Apr. 1, 2009    (GB) .................................. 0905568.2

(51) Int. Cl.
*B64D 41/00*    (2006.01)

(52) U.S. Cl.
USPC .............................. 244/50; 244/2; 244/100 R

(58) Field of Classification Search
USPC ...... 244/50, 58, 55, 60, 100 R, 102 R, 103 R, 244/103 S, 2
See application file for complete search history.

(56) References Cited

U.S. PATENT DOCUMENTS

| 2,376,621 | A  | * | 5/1945  | Reed ........................... 244/103 S |
| 4,659,039 | A  | * | 4/1987  | Valdes ........................ 244/103 S |
| 6,129,306 | A  | * | 10/2000 | Pham .................................. 244/2 |
| 2006/0260323 | A1 | * | 11/2006 | Moulebhar ...................... 60/793 |
| 2008/0217466 | A1 | * | 9/2008  | Bhargava ......................... 244/50 |
| 2008/0251308 | A1 | * | 10/2008 | Molnar et al. ................. 180/209 |

FOREIGN PATENT DOCUMENTS

| WO | WO 2006/138267 A2 | 12/2006 |
| WO | WO 2008/001013 A1 | 1/2008  |
| WO | WO 2008/108933 A1 | 9/2008  |

OTHER PUBLICATIONS

British Search Report issued in British Patent Application No. 0905568.2 on Jul. 22, 2009.

* cited by examiner

*Primary Examiner* — Rob Swiatek
*Assistant Examiner* — Brian M O'Hara
(74) *Attorney, Agent, or Firm* — Oliff and Berridge, PLC

(57) ABSTRACT

Apparatus indicated generally at 26 is incorporated within an aircraft. The apparatus 26 includes an electric motor 28, a first drive train 30 and a second drive train 32. The first drive train 30 provides drive from the electric motor 28 for one or more of the wheels 20, allowing the electric motor 28 to propel the aircraft when taxiing. The second drive train 32 provides drive from the electric motor 28 for an aircraft system which is operational at least when the aircraft is in flight. In this example, the electric motor 28 is illustrated using the second drive train 32 for driving a compressor 34 of the ECS 24, the compressor 34 being responsible for cabin pressurization during flight. A clutch 36 allows the drive train 30 to be connected or disconnected from the electric motor 28, thereby connecting or disconnecting the drive from the electric motor 28 to the wheels 20. The clutch 36 is controlled to disconnect the first drive train 30 when the aircraft is in flight. Thus, when the aircraft is in flight, the full output of the motor 28 is available for driving the compressor 34; when the aircraft is on the ground, the compressor 34 is not required or is less demanding, and surplus output of the motor 28 can be used for driving the wheels 20.

18 Claims, 2 Drawing Sheets

APPARATUS FOR TAXIING AN AIRCRAFT

Figure 1:
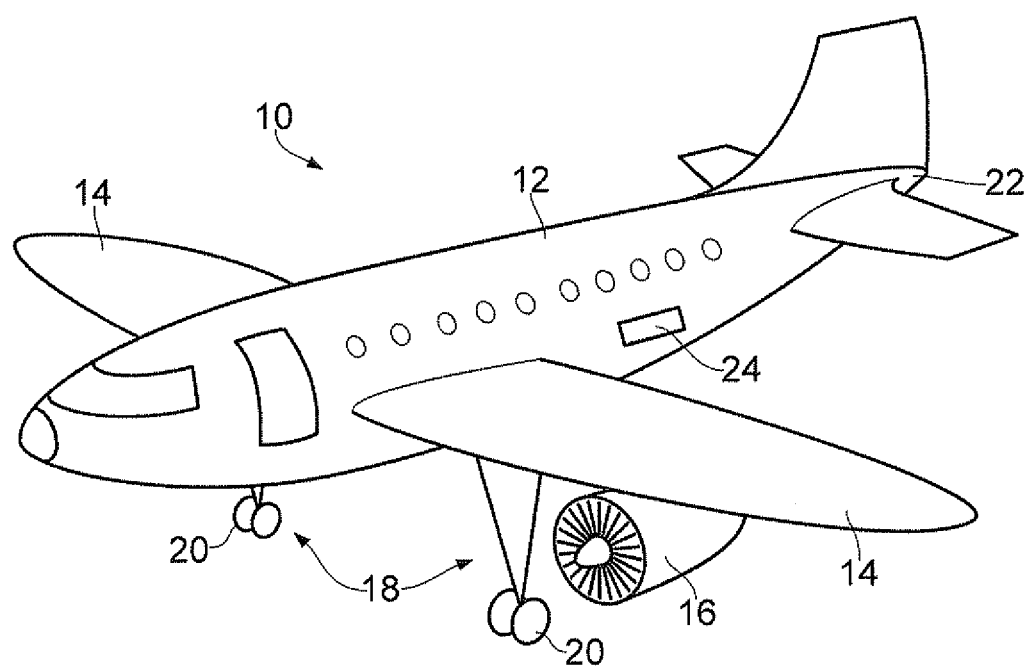

The present invention relates to taxiing. For example, examples of the invention relate to aircraft taxiing.

An aircraft is said to be "taxiing" when it propels itself across the ground. For example, an aircraft will commonly be required to taxi between airport terminal buildings and runways, before takeoff and after landing. It is undesirable to use the main engines of the aircraft to propel the aircraft when taxiing, because this results in significant fuel inefficiency. It has previously been suggested to provide an aircraft with an electric motor to drive ground wheels, allowing an aircraft to be taxied without propulsion from the main engines. However, various practical problems arise. For example, the electric motor represents additional weight and bulk which must be carried during flight, reducing the fuel efficiency of the aircraft during flight. This reduction may offset any increased efficiency obtained during taxiing. The additional bulk may be difficult to accommodate within the tight confines of modern aircraft design.

Accordingly the present invention provides an apparatus comprising:
an electric motor;
a first drive train providing drive from the electric motor for an aircraft wheel;
a second drive train providing drive from the electric motor for an aircraft system which is operational at least when the aircraft is in flight;
a first coupling arrangement operable to connect and disconnect the first drive train;
and a control arrangement operable to control the coupling arrangement to disconnect the first drive train when the aircraft is in flight.

Preferably the apparatus further comprises a second coupling arrangement operable to connect and at least partially disconnect the second drive train, the control arrangement being operable to at least partially disconnect the second drive train at least when the aircraft is on the ground.

The aircraft system may be an environmental control system.

The second drive train may provide drive for a compressor for cabin pressurisation, at least when the aircraft in flight. The second drive train may be operable to maintain drive to a cabin cooling system when a cabin pressurisation compressor is disconnected.

The first drive train may provide mechanical drive. Alternatively the first drive train may provide hydraulic drive. The first drive train may include a hydraulic motor to drive the aircraft wheel. The first drive train may include a drive train portion which extends, in use, along landing gear of an aircraft, to provide drive from the electric motor to an aircraft wheel carried by the landing gear, the electric motor being mounted off the landing gear.

The first coupling arrangement may include a clutch. The first coupling arrangement may include an arrangement operable to disconnect the first drive train upon retraction of landing gear on which the aircraft wheel is mounted.

The control arrangement may include a mechanical linkage operated by movement of the landing gear to operate the disconnection arrangement. The mechanical linkage may operate a clutch of the coupling arrangement.

The apparatus may comprise a power connection for providing power to the electric motor, from an auxiliary power unit of an aircraft.

The present invention also provides an aircraft comprising:
a wheel;
an electric motor;
a first drive train operable to drive the wheel from the electric motor;
an aircraft system other than the wheel and operational at least when the aircraft is in flight;
a second drive train operable to drive the aircraft system from the electric motor;
a first coupling arrangement operable to connect and disconnect the first drive train;
and a control arrangement operable to control the first coupling arrangement to disconnect the first drive train when the aircraft in flight.

Figure 2:
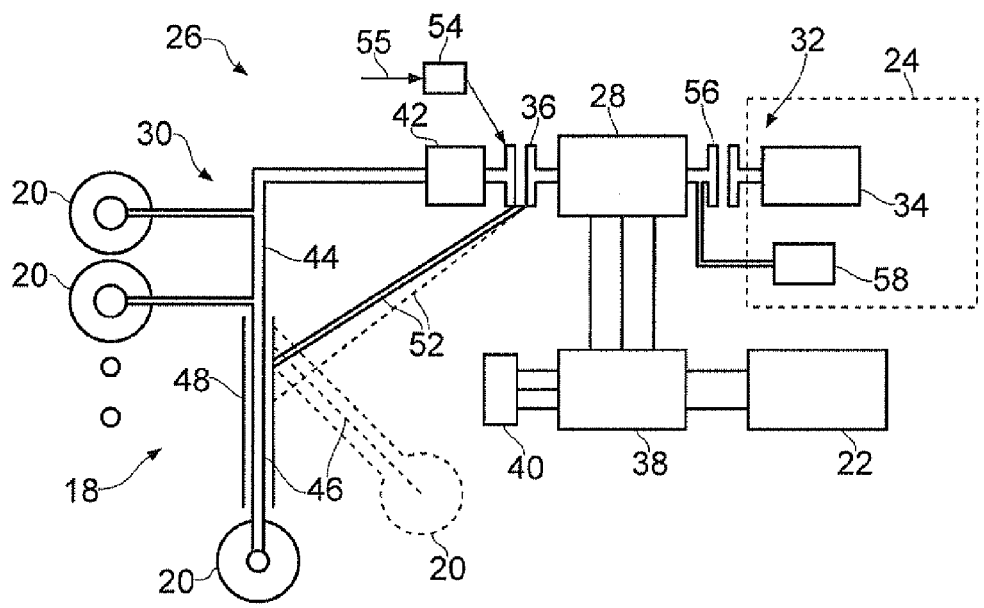
Figure 3:
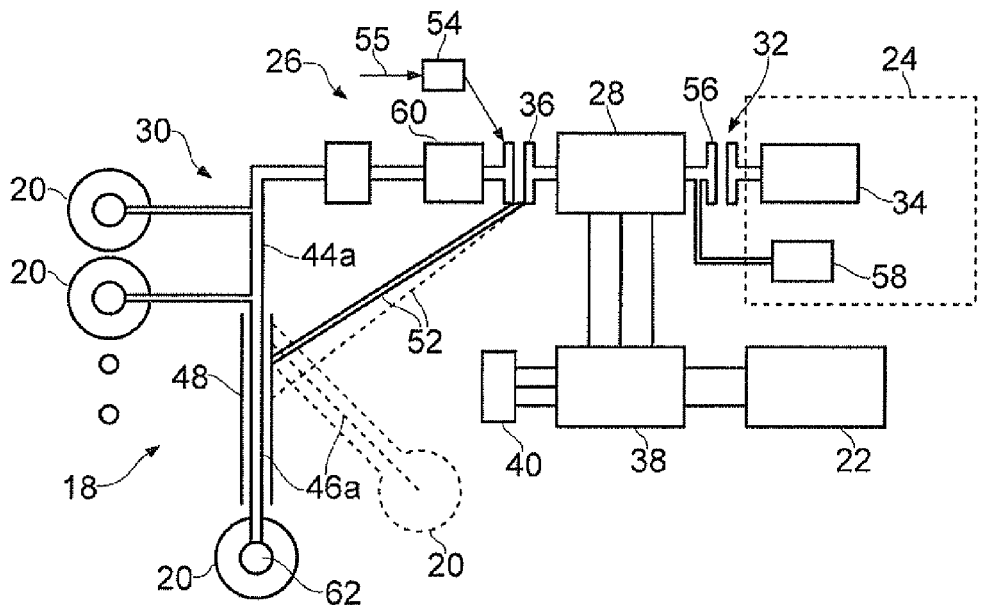

Examples of the present invention will now be described in more detail, with reference to the accompanying drawings, in which:

FIG. 1 is a schematic perspective view of an aircraft with which the present invention may be implemented; and FIGS. 2 and 3 are schematic diagrams of mechanical and hydraulic, respectively, apparatus which are examples of the invention.

FIG. 1 illustrates an aircraft 10 which is in a form generally conventional for a commercial airliner, having a fuselage 12, wings 14, gas turbine engines 16 and retractable undercarriage 18 carrying ground wheels 20. An auxiliary power unit 22, which may be an additional gas turbine engine not used for propulsion, is indicated schematically at the tail of the fuselage 12, which is a conventional location for an APU. The APU 22 could be positioned elsewhere. The APU 22 provides auxiliary power for various systems, including systems which may be needed when the aircraft 10 is on the ground and the main engines 16 are not running. The aircraft 10 also has an environmental control system (ECS) 24, illustrated schematically in FIG. 1.

The ECS 24 provides various functions for environmental control within the fuselage 12. During flight, the ECS 24 maintains pressurisation in the aircraft cabin. The ECS 24 may also provide heating, air conditioning or other environmental control during flight and while the aircraft 10 is on the ground.

FIG. 2 illustrates apparatus indicated generally at 26, incorporated within the aircraft 10. The apparatus 26 includes an electric motor 28, a first drive train 30 and a second drive train 32. The first drive train 30 provides drive from the electric motor 28 for one or more of the wheels 20. The second drive train 32 provides drive from the electric motor 28 for an aircraft system which is operational at least when the aircraft is in flight. In this example, the electric motor 28 is illustrated using the second drive train 32 for driving a compressor 34 of the ECS 24, the compressor 34 being responsible for cabin pressurisation during flight.

The first drive train 30 includes a coupling arrangement in the form of a clutch 36 which allows the drive train 30 to be connected or disconnected from the electric motor 28, thereby connecting or disconnecting the drive from the electric motor 28 to the wheels 20. The clutch 36 is controlled by one or more control arrangements to be described below and which are configured to disconnect the first drive train 30 when the aircraft is in flight.

In more detail, the electric motor 28 is provided with electric power from the APU 22, via a power electronic converter circuit 38 which may form part of the ECS 24 or be provided separately, and which may also provide electric power to other systems (indicated at 40), such as electric starter systems for the main engines 16. The first drive train 30 provides mechanical drive to the wheels 20, in this example. When the clutch 36 is engaged, drive from the motor 28 passes to a gearbox 42 and then through an arrangement 44 of driveshafts or other mechanical couplings to provide mechanical drive to the wheels 20. Drive to the wheels 20 is therefore only available while the clutch 36 is engaged. Since the clutch 36 is disengaged while the aircraft 10 is in flight, drive to the wheels 20 is not available during flight. When the aircraft 10 is no longer in flight, and is on the ground, the clutch 36 can be engaged to allow the wheels 20 to be driven, so that the aircraft 10 may be taxied under propulsion from the motor 28, which is itself provided with electrical power from the APU 22.

The first drive train 30 has a portion 46 which extends along a leg 48 of the landing gear or undercarriage 18 on which the corresponding driven wheel 20 is mounted. This allows the wheel 20 to be driven by the electric motor 28, when the aircraft 10 is taxiing, but with the electric motor 28 mounted off the landing gear 18. Accordingly, while the landing gear 18 must be adapted to accommodate the portion 46, it is not required to accommodate the motor 28, which is convenient in view of the space limitations within the landing gear 18, and in reducing or eliminating any requirement for the landing gear 18 to be strengthened and thus made more heavy.

In FIG. 2, the landing gear 18 is shown extended, in a position used when the aircraft 10 is on the ground. FIG. 2 also illustrates, in broken lines, a retracted position for the landing gear 18, such as would be taken up during flight.

A coupling arrangement 52 is provided between the landing gear 18 and the clutch 36. The arrangement 52 is illustrated highly schematically in FIG. 2, and may be any appropriate design of mechanical, electro-mechanical, hydraulic or other coupling arrangement 52. The purpose of the coupling arrangement 52 is to control the clutch 36 in dependence on the state of the landing gear 18. Thus, as the landing gear 18 moves between its extended and retracted positions, the coupling arrangement 52 conveys this to the clutch 36, causing the clutch 36 to disconnect the first drive train when the undercarriage 18 is retracted, indicating that the aircraft 10 is in flight.

In an alternative arrangement, control of the clutch 36 may be by an appropriate control circuit 54 of electrical, electronic, hydraulic, mechanical or other nature. Again, the purpose of the control circuit 54 is to cause the clutch 36 to disconnect the first drive train 30 when the aircraft 10 is in flight. For example, the control circuit 54 may allow the clutch 36 to engage only when the circuit 54 is receiving a "weight on wheels" signal 55 indicating that the wheels 20 are on the ground.

The second drive train 32 provides drive to the compressor 34 through a second clutch 56. Thus, the clutch 56 acts as a second coupling arrangement to connect and disconnect the second drive train 32 from the motor 28. The second drive train 32 may also provide direct drive (not through the clutch 56) to another compressor 58 of the ECS 24, such as a compressor used for heating, cooling or other climate control within the aircraft cabin, and thus likely to be in use when the aircraft 10 is on the ground as well as when the aircraft 10 is in flight. Alternatively, a separate clutch (not shown) may be provided between the compressor 58 and the motor 28.

Thus, the clutch 56 may wholly disconnect the second drive train 32 (if there is no drive to anything other than the compressor 34), or may partially disconnect the second drive train 32 (in the event that another system is driven independently of the clutch 56). Thus, the second drive train 32 may be configured to provide drive for the compressor 34 for cabin pressurisation when the aircraft 10 is in flight, and to maintain drive to a cabin cooling system or other environmental control system when the cabin pressurisation compressor 34 is disconnected. The clutch 56, wholly or partially, disconnects the second drive train 32 when the aircraft is on the ground and the clutch 56 fully connects the second drive train 32 when the aircraft is in flight.

FIG. 3 illustrates alternative apparatus 26a which correspond closely, in many respects, with the apparatus 26 of FIG. 2, differing primarily in that the first drive train 30a is primarily hydraulic, rather than mechanical. Accordingly, the same reference numerals are used again in relation to features which may be the same as those described in relation to FIG. 2, and reference numerals suffixed "a" used for features which correspond with features described previously.

FIG. 3 illustrates apparatus indicated generally at 26a, incorporated within the aircraft 10. The apparatus 26a includes an electric motor 28, a first drive train 30a and a second drive train 32. The first drive train 30a provides drive from the electric motor 28 for one or more of the wheels 20. The second drive train 32 provides drive from the electric motor 28 for an aircraft system which is operational at least when the aircraft is in flight. In this example, the electric motor 28 is illustrated using the second drive train 32 for driving a compressor 34 of the ECS 24, the compressor 34 being responsible for cabin pressurisation during flight.

The first drive train 30a includes a coupling arrangement in the form of a clutch 36 which allows the drive train 30a to be connected or disconnected from the electric motor 28, thereby connecting or disconnecting the drive from the electric motor 28 to the wheels 20. The clutch 36 is controlled by one or more control arrangements to be described below and which are configured to disconnect the first drive train 30 when the aircraft is in flight.

The electric motor 28 is provided with electric power from the APU 22, as described above. The first drive train 30a provides mechanical drive to the wheels 20, in this example. When the clutch 36 is engaged, drive from the motor 28 passes to a hydraulic pump 60 and then through an arrangement 44a of manifolds and pipework to provide hydraulic drive to hydraulic motors 62 incorporated within the wheels 20. Drive to the wheels 20 is therefore only available while the clutch 36 is engaged. Since the clutch 36 is disengaged while the aircraft 10 is in flight, drive to the wheels 20 is not available during flight. When the aircraft 10 is no longer in flight, and is on the ground, the clutch 36 can be engaged to allow the wheels 20 to be driven, so that the aircraft 10 may be taxied under propulsion from the motor 28, which is itself provided with electrical power from the APU 22.

The first drive train 30a has a portion 46a which extends along a leg 48 of the landing gear or undercarriage 18 on which the corresponding driven wheel 20 is mounted. This allows the wheel 20 to be driven by the electric motor 28, when the aircraft 10 is taxiing, but with the electric motor 28 mounted off the landing gear 18. Accordingly, while the landing gear 18 must be adapted to accommodate the portion 46a, it is not required to accommodate the motor 28, which is convenient in view of the space limitations within the landing gear 18, and in reducing or eliminating any requirement for the landing gear 18 to be strengthened and thus made more heavy.

In FIG. 3, the landing gear 18 is shown extended, in a position used when the aircraft 10 is on the ground. FIG. 3 also illustrates, in broken lines, a retracted position for the landing gear 18, such as would be taken up during flight.

A coupling arrangement 52 is provided between the landing gear 18 and the clutch 36. The arrangement 52 is illustrated highly schematically in FIG. 3, and may be any appropriate design of mechanical, electro-mechanical, hydraulic or other coupling arrangement 52. The purpose of the coupling arrangement 52 is to control the clutch 36 in dependence on the state of the landing gear 18. Thus, as the landing gear 18 moves between its extended and retracted positions, the coupling arrangement 52 conveys this to the clutch 36, causing the clutch 36 to disconnect the first drive train 30a when the undercarriage 18 is retracted, indicating that the aircraft 10 is in flight.

In an alternative arrangement, control of the clutch 36 may be by an appropriate control circuit 54 of electrical, electronic, hydraulic, mechanical or other nature. Again, the purpose of the control circuit 54 is to cause the clutch 36 to disconnect the first drive train 30a when the aircraft 10 is in flight. For example, the control circuit 54 may allow the clutch 36 to engage only when the circuit 54 is receiving a "weight on wheels" signal 55 indicating that the wheels 20 are on the ground.

The second drive train 32 provides drive to the compressor 34 through a second clutch 56. Thus, the clutch 56 acts as a second coupling arrangement to connect and disconnect the second drive train 32 from the motor 28. The second drive train 32 may also provide direct drive as described above, or a second drive through a separate clutch (not shown), again as described above.

Thus, the clutch 56 may wholly disconnect the second drive train 32 (if there is no drive to anything other than the compressor 34), or may partially disconnect the second drive train 32 (in the event that another system is driven independently of the clutch 56). Thus, the second drive train 32 may be configured to provide drive for the compressor 34 for cabin pressurisation when the aircraft 10 is in flight, and to maintain drive to a cabin cooling system or other environmental control system when the cabin pressurisation compressor 34 is disconnected.

FIG. 2 has illustrated an arrangement in which the first drive train is principally mechanical, and FIG. 3 has illustrated an alternative arrangement in which the first drive train is primarily hydraulic. Other combinations of electrical, electronic, hydraulic, mechanical or other drive train technologies could be used.

In both of these examples, the load on the motor 28 caused by the requirement to drive the first drive train 30 and the wheels 20 is only present when the aircraft 10 is on the ground and the aircraft 10 is taxiing. When the aircraft 10 is in flight, the motor 28 is loaded by driving the cabin pressurisation compressor 34, but is not loaded by driving the first drive train 30 and the wheels 20. In either situation, the motor 28 may be loaded by driving the compressor 58. We have recognized that when the aircraft 10 is on the ground, the load on the motor 28 reduces because the compressor 34 is not being driven, and this surplus output can be directed to driving the wheels 20 by engaging the clutch 36. In so doing, the motor 28 is shared between two functions (cabin pressurisation and propulsion for taxiing) which are unlikely ever to be required simultaneously. The result is to allow aircraft taxiing to be powered electrically from the APU 22 with minimal additional components (and therefore weight) being required and in particular, without requiring an additional motor solely for the purpose of driving the wheels 20. In addition to saving weight, the avoidance or minimisation of additional components saves space within the aircraft 10.

Many variations and modifications can be envisaged for the apparatus described above. In particular, many of the components described above can be implemented as mechanical, electrical, electromechanical, hydraulic, electro-hydraulic, pneumatic or other types of system.

The invention claimed is:

1. An apparatus comprising:
   an electric motor;
   a first drive train providing drive from the electric motor to a landing gear wheel;
   a second drive train providing drive from the electric motor for an aircraft system which is operational at least when the aircraft is in flight, the aircraft system including an environmental control system;
   a first coupling arrangement configured to connect and disconnect the first drive train;
   a second coupling arrangement configured to connect and at least partially disconnect the second drive train; and
   a control arrangement configured to
      control the first coupling arrangement and the second coupling arrangement such that the first drive train is connected when the second drive train is at least partially disconnected and the first drive train is disconnected when the second drive train is connected,
      control the first coupling arrangement to disconnect the first drive train when the aircraft is in flight and to connect the first drive train when the aircraft is on the ground such that the first drive train is configured to drive the landing gear wheel during taxiing, and
      at least partially disconnect the second drive train when the aircraft is on the ground and to connect the second drive train when the aircraft is in flight such that the second drive train is configured to provide drive for the environmental control system to pressurize the aircraft when the aircraft is in flight.

2. The apparatus according to claim 1, wherein the second drive train provides drive for a first compressor for cabin pressurization, at least when the aircraft is in flight.

3. The apparatus according to claim 2, wherein the second drive train is configured to maintain drive to a second compressor of a cabin cooling system when the first compressor providing cabin pressurization is disconnected.

4. The apparatus according to claim 1, wherein the first drive train provides mechanical drive.

5. The apparatus according to claim 1, wherein the first drive train provides hydraulic drive.

6. The apparatus according to claim 5, wherein the first drive train includes a hydraulic motor to drive the landing gear wheel.

7. The apparatus according to claim 1, wherein the first drive train includes a drive train portion which extends, in use, along a landing gear of the aircraft, to provide drive from the electric motor to the landing gear wheel carried by the landing gear, the electric motor being mounted off the landing gear.

8. The apparatus according to claim 1, wherein the first coupling arrangement includes a clutch.

9. The apparatus according to claim 1, wherein the control arrangement includes a disconnection arrangement operable to disconnect the first drive train upon retraction of landing gear on which the landing gear wheel is mounted.

10. The apparatus according to claim 9, wherein the control arrangement includes a mechanical linkage operated by movement of the landing gear to operate the disconnection arrangement.

11. The apparatus according to claim 10, wherein the mechanical linkage operates a clutch of the coupling arrangement.

12. The apparatus according to claim 1, comprising a power connection for providing power to the electric motor, from an auxiliary power unit of an aircraft.

13. An aircraft comprising:
   a landing gear wheel;
   an electric motor;
   an auxiliary power unit that provides power to the electric motor;

a first drive train configured to drive the landing gear wheel from the electric motor;
an aircraft system other than the landing gear wheel and operational at least when the aircraft is in flight, the aircraft system including an environmental control system;
a second drive train configured to drive the aircraft system from the electric motor;
a first coupling arrangement configured to connect and disconnect the first drive train;
a second coupling arrangement configured to connect and at least partially disconnect the second drive train; and
a control arrangement configured to
    control the first coupling arrangement and the second coupling arrangement such that the first drive train is connected when the second drive train is at least partially disconnected and the first drive train is disconnected when the second drive train is connected,
    control the first coupling arrangement to disconnect the first drive train when the aircraft is in flight and to connect the first drive train when the aircraft is on the ground such that the first drive train is configured to drive the landing gear wheel during taxiing, and
    at least partially disconnect the second drive train when the aircraft is on the ground and to connect the second drive train when the aircraft is in flight such that the second drive train is configured to provide drive for the environmental control system to pressurize the aircraft when the aircraft is in flight.

14. An aircraft comprising:
a cabin;
landing gear, the landing gear having a landing gear wheel;
an electric motor;
an auxiliary power unit, the auxiliary power unit providing power to the electric motor;
a first drive train configured to drive the landing gear wheel from the electric motor;
an aircraft system other than the landing gear wheel and operational at least when the aircraft is in flight, the aircraft system including an environmental control system;
a second drive train configured to drive the environmental control system from the electric motor;
a first coupling arrangement configured to connect and disconnect the first drive train;
a second coupling arrangement configured to connect and at least partially disconnect the second drive train; and
a control arrangement configured to
    control the first coupling arrangement and the second coupling arrangement such that the first drive train is connected when the second drive train is at least partially disconnected and the first drive train is disconnected when the second drive train is connected,
    control the first coupling arrangement to disconnect the first drive train when the aircraft is in flight and to connect the first drive train when the aircraft is on the ground such that the first drive train is configured to drive the landing gear wheel during taxiing, and
    at least partially disconnect the second drive train when the aircraft is on the ground and to connect the second drive train when the aircraft is in flight such that the second drive train is configured to pressurize the cabin when the aircraft is in flight.

15. The aircraft according to claim 14, wherein the landing gear wheel is mounted on the aircraft landing gear when the aircraft in on the ground for taxiing.

16. The aircraft according to claim 14, wherein the second drive train directly drives the aircraft system.

17. The aircraft according to claim 14, wherein the control arrangement is configured to connect the first drive train when the control arrangement receives a signal that there is weight on the wheels.

18. The aircraft according to claim 14, wherein
the environmental control system includes a first compressor and a second compressor, the first compressor being arranged to pressurize the cabin when the aircraft is in flight, and the second compressor being arranged in a cabin cooling system, and
the control arrangement is configured to disconnect the second drive train from the first compressor when the aircraft is on the ground and to connect the second drive train to the first compressor when the aircraft is in flight, the control arrangement being configured to maintain the connection between the second drive train and the second compressor when the first compressor is disconnected.

* * * * *